United States Patent

[11] 3,564,273

[72] Inventor William D. Cockrell
 Waynesboro, Va.
[21] Appl. No. 681,819
[22] Filed Nov. 9, 1967
[45] Patented Feb. 16, 1971
[73] Assignee General Electric Company
 a corporation of New York

[54] PULSE WIDTH MODULATED CONTROL SYSTEM WITH EXTERNAL FEEDBACK AND MECHANICAL MEMORY
22 Claims, 5 Drawing Figs.

[52] U.S. Cl. ............................................. 290/40;
 318/696, 318/599; 415/17
[51] Int. Cl. ............................................. F01d 17/00
[50] Field of Search.......................................... 318/138,
 254, 20.050, 20.290, 20.300, 20.310; 318/20.085,
 341, (Inquired); 244/77, 77D, (Inquired); 415/1,
 17, (Inquired); 290/40, (Inquired)

[56] References Cited
UNITED STATES PATENTS
| | | | |
|---|---|---|---|
| 3,184,188 | 5/1965 | Rossire .................... | 318/(20.085) |
| 3,446,224 | 5/1969 | Zwicky ..................... | 415/17 |
| 3,486,100 | 12/1969 | James ...................... | 318/341 |
| 3,105,927 | 10/1963 | Flatten et al............... | 318/(20.310) |
| 3,131,340 | 4/1964 | Johnson et al. ............ | 318/28(20.290) |
| 3,181,046 | 4/1965 | Sutton ..................... | 318/28(20.290) |
| 3,238,376 | 3/1966 | Ernst et al. ................ | 290/40XL |
| 3,244,898 | 4/1966 | Hickox ..................... | 290/40XR |
| 3,274,443 | 9/1966 | Eggenberger et al. ....... | 290/40XV |
| 3,416,052 | 12/1968 | Russell et al. ............. | 318/18(20.290) |

Primary Examiner—G. R. Simmons
Attorneys—Lawrence G. Norris, Michael Masnik, Stanley C. Corwin, Frank L. Neuhauser, Oscar B. Waddell and Melvin M. Goldenberg ABSTRACT: This invention comprises a control system for electrically controlled, mechanically actuated mechanisms of large power rating. Such mechanisms normally include mechanical actuating devices such as control valves for controlling the output operating condition of the mechanism. The control system of the invention includes electric power modulation circuit means having its input coupled to a source of electric control signals for controlling the operation of the mechanism and for producing output modulated controlled electric power signals. These output modulated controlled power signals are applied to an electromechanical positioning device such as a servomotor which has its output mechanically coupled to and controlling the position of the mechanical actuating means (valve) of the mechanism. The input of the servomotor is coupled to and controlled by the output from the electric power modulation circuit. The electric power modulation circuit preferably comprises a pulse width modulation circuit having a source of constant period pulsed clock signals supplied thereto and two output terminals. The input control signal selectively controls the width at the clock rate of the output signal pulses produced at the output of the modulation circuit as well as selects the output terminal to which the pulse width modulated pulses are supplied. As a result, the pulse width modulated output signals from one output terminal will serve to adjust the servomotor in one direction while the signals from the remaining output terminal serve to adjust the servomotor in the other direction. By reason of this arrangement, the last adjusted position of the mechanical actuating means by the servomotor serves as a memory for the overall control system until the next adjustment of the operating condition by the control system. The control system of the invention is particularly intended for use with turbine-generator sets and for controlling the startup and initial loading of the turbine-generator set until such time that it has attained its optimum operating condition.

FIG. 1

INVENTOR.
WILLIAM D. COCKRELL
BY Michael Masnik
HIS ATTORNEY

PATENTED FEB 16 1971

*INVENTOR.*
WILLIAM D. COCKRELL
BY Michael Masnik
HIS ATTORNEY

PULSE WIDTH MODULATED CONTROL SYSTEM WITH EXTERNAL FEEDBACK AND MECHANICAL MEMORY

BACKGROUND OF INVENTION

1. Field of Invention

This invention relates to a new and improved control system for electrically controlled, mechanically actuated mechanisms of large power rating such as turbine-generator sets.

The modern steam turbine which generates a half million horsepower of electricity is a rather sophisticated machine. The boiler generates the steam which flows past blades mounted in the shell which deflect it onto buckets attached to the revolving rotor. After expending part of its energy pushing on the first row of buckets, it is again deflected by a second row of blades onto another row of buckets and so on through many stages until its energy is spent and it is collected in the exhaust hood to be finally chilled and condensed back to water and pumped again into the boiler.

To obtain maximum efficiency very high temperatures and pressures are used. This requires very special steel alloys to withstand the high forces and remain strong at the elevated temperatures. Also these large units must have very thick rotor shafts. The heat of the steam flowing over the rotor penetrates the metal at a rather slow rate so that as the hotter outer material tries to expand, severe thermal stresses can be set up in the rotor material.

To make matters more difficult, maximum efficiency demands that after passing through a number of stages, the steam be returned to the boiler for the addition of more heat energy before returning to the lower pressure stages. At times this is an entirely separate unit.

There is one point of control of the steam flow. This is the entrance to the first high pressure stage. Here control valves open sequentially to feed steam to various sectors of the first stage blade circle. However, when a cold turbine is being started, in order to prevent unequal heating and failure of the casing it is customary to open all of the control valves to obtain uniform steam flow and to control the flow by a small bypass valve built into the main steam valve from the boiler. When it is realized that a modern turbine requires only 1 or 2 percent of steam flow to drive an unloaded turbine at full speed the desirability of the bypass valve control becomes evident.

So that the turbine may run smoothly with minimum vibration at full speed the rotor is designed to have a natural resonant frequency at around one-third to one-half full speed. The buckets and other components may have resonances over a wide range of speeds. Therefore good practice requires that as the turbine is brought up to speed it must pass through the rotor resonant speed range quickly (no less than one-third the maximum acceleration rate) and if the speed must be held at any point off resonance for thermal stress reasons the speed must not stay constant but must change at a minimum rate (about 3 percent of the maximum acceleration rate) to prevent destructive bucket resonance.

Minor requirements such as maximum acceleration to about one-quarter speed to permit certain instruments to become operative, and after loading starts the rapid rise to 3 percent load for boiler stability or a similar purpose are also factors to be considered.

To aid the startup the turbine is usually rotated slowly by a turning gear motor for a number of hours while a little steam flows through to heat the unit uniformly to a temperature compatible with the starting steam temperature.

A satisfactory steam turbine startup control must take all of the above limitations into consideration. There are actually four functions. First the turbine must be accelerated to approximately full speed. Second, the turbine must be synchronized or have its generator output voltage and phase matched to the power system and the circuit closed to it. Third, the turbine output power must be increased to limit of the fully opened bypass valve. And finally, fourth, the control is transferred from the bypass valve to the sequential control valves as the main valve from the boiler is opened wide. Reference may be made to U.S. Pat. 3,446,224 dated May 27, 1969 issued to E. E. Zwicky and assigned to the common assignee for further background information.

The control herein described performs the two most complex functions, acceleration and loading, and monitors the other two for conditions which might require preventative manual action.

During acceleration the main gate, described herein, has a maximum output of 5 volts DC which, as the input signal to an electrohydraulic or electromechanical servo system, controls the rate of opening of the bypass valve and the turbine acceleration.

As full speed is reached a synchronizing system, not part of this disclosure, is actuated to connect the turbine generator to the power system. As the main circuit breaker is closed the control is switched to function as a load control It uses the same 5 volt signal as the input of an auxiliary function described herein which translates it into a reversing pulse-width modulation of constant speed motor which positions a reference potentiometer. This reference is now the input to the valve servo mentioned previously which now opens the bypass valve as required for lading control.

After the bypass valve is fully open a transfer action takes place as the main valve is opened slowly and the sequential control valves are closed a corresponding amount to provide a smoothly controlled flow of steam to the turbine first stage. During the transfer action the control valves, steam chest and adjacent areas begin to be subjected to the boiler steam temperature and pressure. Hence the transfer can be limited to a safe rate by an additional lowest margin input to the main gate described herein although this function is not described in detail in this disclosure.

2. Statement of Prior Art

In the past, it has been necessary in the startup and initial loading of many large mechanisms (such as turbine-generator sets) to employ extensively trained personnel who were capable of carefully monitoring each operating stage during startup and running of the mechanism (particularly initial loading) using appropriate and extensive instrumentation. With the continually expanding need for electric power generation equipment, this has become a troublesome problem with respect to the startup and running of turbine-generator sets due to the lack of adequately trained personnel, and the expense involved in their training, maintenance of their competence, and the installation and maintenance of the extensive instrumentation required for safe manual or semiautomatic operation. Turbine-generator sets are typical of many large mechanisms which are mechanically actuated in that they require the opening and closing of several steam supply valves which control admission of steam into the turbine during startup, loading, and running of the set. As pointed out above, heretofore this has been done manually from informative charts. In addition to these requirements, the startup and initial loading of a turbine-generator set using manual procedures requires a number of progressive operating stages in order to assure safe startup and initial loading of the equipment. To overcome certain of these problems, and provide safer startup, the present invention was developed.

The present invention is intended to provide an electrically operated control system which can automatically adjust the loading on a steam-turbine generator set to a desired value within an optimum time period with minimum hazard to the equipment involved. To accomplish this, the new and improved, automatically operating control system of the invention has been provided for controlling large, mechanically actuated mechanisms.

It is therefore a primary object of the present invention to provide an electrically operable control system for mechanically actuated mechanisms of large power rating which employ the last adjusted position of the mechanically actuated mechanism as a memory to provide a reference against which further control commands are compared in order to ascertain the direction and extent of further adjustments to the operating condition of the mechanism by the control system.

Another object of the invention is to provide a new and improved control system for electrically controlled, mechanically actuated mechanisms wherein the mechanism is automatically controlled after startup, during initial loading and running of the mechanism in a manner such that any one of a number of control factors can selectively exercise control over the operating condition of the mechanism so as to assure safe loading and running of the equipment within a minimum time period and with minimum hazard to the equipment. This is achieved with the control system of the invention while at the same time allowing a control factor of primary interest, such as loading, to override and assume control of the mechanism upon attaining a predetermined operating condition.

In practicing the invention a control system for electrically controlled, mechanically actuated mechanisms of large power rating (such as turbine-generator sets) is provided. Such mechanisms generally include mechanical actuating means for controlling the operating condition of the mechanism. For example, in the case of a turbine-generator set the mechanical actuating means would comprise the steam supply valve between the boiler and the steam turbine together with its associated bypass, control valves and electrohydraulic actuating mechanisms. The control system according to the invention comprises electric power modulation circuit means having its input coupled to a source of electric control signals for controlling the operation of the mechanism and having its output connected to an electromechanical positioning means which in turn mechanically controls the mechanically actuated control means of the mechanism. By reason of this arrangement, the mechanical actuating means upon being mechanically positioned by the electromechanical positioning means thereafter serves as a memory unit for the control system until the next adjustment of the operating condition by the source of electric control signals. The electric power modulation circuit means preferably comprises a pulse width modulation circuit having a source of constant period, pulsed clock signals supplied thereto and two output terminals. The input control signal serves to selectively control the width of the output pulses produced by the modulation circuit and selects the output terminal to which the pulse width modulated output signal pulses are supplied. The pulse width modulated output signals appearing at one of the output terminals then serves to adjust the electromechanical positioning means in one direction and the signals from the remaining output terminal serve to adjust the positioning means in the other direction. The electromechanical positioning means preferably comprises a servomotor having at least two actuating windings for selectively driving the motor in opposite directions and mechanically coupled to and during the mechanical actuating means of the large mechanism being controlled. The servomotor has one of its actuating windings selectively energized by the pulse width modulated signal derived from one output terminal of the pulse width modulation circuit for driving the mechanism in a first direction to an extent determined by the pulse width modulation of the output signals. The remaining actuating winding of the servomotor is selectively energized by the pulse width modulated output signals derived from the remaining output terminal for driving the mechanism in a reverse direction.

In a preferred embodiment of the invention, the electric control signal is selected from a plurality of externally derived, electric feedback signals representative of a plurality of externally measured quantities indicative of a number of operating characteristics of the mechanism being controlled. In the case of a turbine-generator set, this plurality of feedback signals may represent the output indications of sensing instruments for sensing such factors as turbine casing temperature, turbine speed, expansion, vibration, eccentricity, elongation. These sensed signals are compared with corresponding reference or permissible level signals to yield margin signals. These are compared with previous measured margins and a predicted margin value is established. These computed, predicted future values of certain operating characteristics are derived from the existing instantaneous measured values by a suitable logic unit employed in association with the control system. The plurality of feedback signals corresponding to stress margins (based on temperature measurements) are supplied to a main gate selection means which selects the most critical one of these feedback signals for use in controlling the operation of the mechanism so that at any particular point in the operation of the mechanism it is always being controlled in accordance with its most critical operating condition.

Other objects, features and many of the attendant advantages of this invention will be better understood after a reading of the following detailed description when considered in connection with the accompanying drawings—wherein like parts in each of the several figures are represented by the same reference character—and wherein:

DETAILED DESCRIPTION OF PREFERRED EMBODIMENT

Overall System

Figure 1:
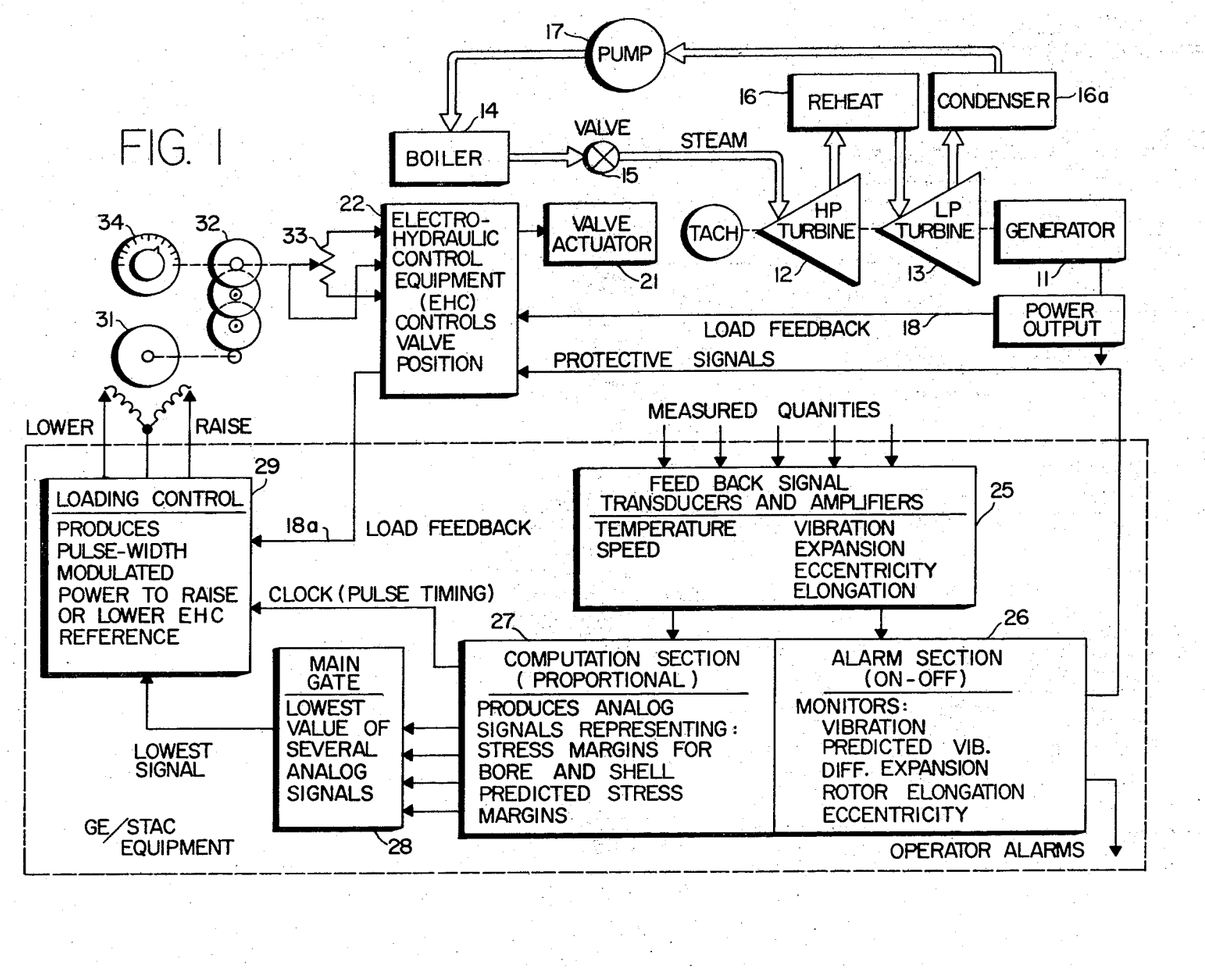
FIG. 1 is a functional block diagram of an overall control system constructed in accordance with the invention for use in controlling the loading of a steam-turbine generator set.

FIG. 1 of the drawings is a functional block diagram of an overall control system for electrically controlled, mechanically actuated mechanisms of large power rating, constructed in accordance with the invention. The particular mechanism shown in FIG. 1 comprises a turbine-generator set formed by an electric generator 11 that is driven by a high pressure turbine stage 12 and a low pressure turbine stage 13. As is conventional with such turbine-generator sets, the high pressure turbine stage 12 is driven by high pressure, high temperature steam from a boiler 14 supplied to the high pressure turbine stage 12 through a main steam valve and its associated bypass and control valves, all indicated schematically at 15. The used steam emitted from the discharge end of the high pressure turbine stage 12 is passed through a reheat cycle 16 to the inlet end of the low pressure turbine stage 13 and thereafter discharges from the outlet end of the low pressure turbine stage 13 into a condenser 16A where it is condensed into water and recirculated by a pump 17 back to the boiler 14. The entire arrangement forms a conventional, closed-cycle steam turbine-generator set for driving the generator 11 which then generates electric power that is supplied to suitable distribution equipment not included as a part of this overall system. It might be mentioned however, that an indication of the power generated by the generator 11 is fed back to the control system as a direct feedback signal for use by the control system in a manner to be described more fully hereinafter. This feedback signal is obtained over a connection indicated at 18.

The main steam valve and its associated bypass and control valves, indicated schematically at 15, comprise a mechanical actuating means for the steam turbine-generator set and are controlled by a suitable valve actuator mechanism shown at 21 that in turn is controlled by an electrohydraulic control equipment shown at 22. The electrohydraulic control equipment 22 comprises part of an electromechanical positioning means for the main steam valve assembly 15 so as to open or close the valve assembly in accordance with control commands supplied to the electrohydraulic control equipment 22. The electrohydraulic control equipment 22, valve actuator 21 and main steam valve assembly 15 are all entirely conventional in their construction and operation and have been described in a number of previously published articles and patents. For example, see U.S. Pat. No. 3,274,443—issued Sept. 20, 1966—for "Redundant Speed Control System"—M. A. Eggenberger and P. H. Troutman—Inventors, assigned to the General Electric Company.

The turbine-generator set described above is entirely conventional in its construction and operation and has been described in detail in a number of previously published articles and patents. Heretofore, however, such turbine-generator sets have been started either manually or semiautomatically by skilled personnel who must monitor a number of points in the overall system both as to temperature, pressure, vibration, expansion, predicted temperature changes, etc. so as to assure that during startup, initial loading and running, the equipment is not damaged. This is particularly critical during the startup and initial loading of the equipment since at these times the turbine casing, etc., previously has been cool, and expansion due to thermal changes, etc., can result in cracking of the turbine casing or other similar damage to the equipment.

To avoid damaging the turbine-generator set during initial startup, loading, and running of the equipment, a number of measurements are taken at various stations located throughout the equipment for measuring temperature, speed, vibration, expansion, eccentricity, elongation, and other characteristics of the equipment which then can be used in controlling the equipment or providing necessary alarms so as to assure safe operation. These measured quantities can be accomplished with conventional measuring devices and indications of the measured values supplied to a feedback signal transducer and amplification circuitry indicated at 25. The output from the signal transducer and amplification circuit 25 may then be supplied to an alarm section indicated at 26 which then will provide an alarm indicating that at some point in the turbine-generator set the vibration, predicted vibration, differential expansion, rotary elongation, eccentricity, etc., is excessive and changes must be made in the rate of increasing loading, etc., on the generator in order to safely achieve operation of the set. The feedback signal transducer and amplification circuitry 25 also supplies a number of inputs to a computation section or logic unit shown at 27 which thereafter operates on the feedback signals supplied thereto to provide predicted values of stress margins occurring in the bore and shell of the high pressure turbine stage, and reheat bore and shell, and other critical parts of the equipment where such values can accurately indicate safe operation of the turbine-generator set.

The computation section 27 has been described more fully in U.S. Pat. No. 3,340,883—J. R. Peternel and for a more detailed description of the computation section 27 reference is made to the above-identified patent. Briefly, however, it can be stated that the computation section 27 is supplied with input information (measurements) relating to the temperature and speed at particular points on the turbine and reheat stage shells and cores by the feedback signal transducer and amplification section 25, and performs certain calculations using these inputs to arrive at predicted and actual stress margins for the turbine bore and shell at various critical points in the turbine and reheat stages. Because of the long time constants involved in the arithmetic calculations being performed by the computation section, these calculations are done by digital circuitry. Indications of speed, temperature and other inputs supplied to the computation section are transformed into digital numbers, and are compared digitally to preset reference values. The differences or safety "margins" are then reconverted to analogue signals which are representative of the actual instantaneous values of the stress margins and predicted future stress margins for the turbine bore and shell and reheat stage. The analogue signals together then with the other actual instantaneous measurements of margins for vibration, temperature, eccentricity, elongation, etc., obtained directly from the turbine supervisory instrumentation, are transmitted both to the alarm section 26, and to a main gate selection means shown at 28 to be described more fully hereinafter.

The main gate selection means 28 is designed to receive the plurality of analogue output signals supplied thereto from the computation section 27 and to select from this plurality of signals the one analogue signal having the lowest value for transmission to the loading control circuit means 29. It should be recalled at this point that the computation circuit 27 accepts temperature and speed data from the feedback signal transducer and amplification section 25 and performs certain calculations on this data to arrive at output analogue signals representative of the temperature and stress margin values, both present and predicted, for the surface and bore of both the high pressure and reheat stage turbines. It will be appreciated therefore that since these signals are representative of both the actual and predicted future values of temperature and stress margins, it is desirable to select from these signals that one which has the lowest value for use in controlling the turbine-generator set in order to assure safe operation of the set. The manner in which the main gate selection means 28 is constructed and operates to perform this function will be described more fully hereinafter in connection with FIG. 2 of the drawings.

The loading control circuit 29 is in effect a pulse width modulation circuit which produces pulse width modulated output electric power signals that are supplied to the actuating windings of a constant speed servomotor (such as a synchronous or induction motor) shown at 31. The motor 31 in turn is mechanically coupled through a suitable gear assembly 32 to a reference potentiometer 33 for driving a movable contact on the reference potentiometer. The reference potentiometer 33 in turn is connected to control the operation of the electrohydraulic control equipment 22 that in turn drives the valve actuator mechanism 21 that opens and closes the main steam valve assembly and its associated bypass and control valves indicated at 15. The gear assembly 32 is also coupled to a manual reference adjustment knob shown at 34 by means of which the reference potentiometer 33 can be manually adjusted. With this arrangement the control system of the invention can be overridden manually by the manual reference adjustment setting fed into the system by the knob 34.

The loading control circuit 29 will be described more fully hereinafter in connection with FIG. 3 of the drawings. It should be noted, however, that the particular embodiment of the control system shown in FIG. 1 is designed for controlling the loading on the generator 11. For this reason, a load feedback signal is developed as the primary control signal for use in the operation of the system, and is supplied back over a direct feedback path 18 to the electrohydraulic control equipment 22 for use by this equipment. This direct feedback path is also supplied back through an extension of the conductive path 18 shown at 18a to the loading control circuit means 29 for use by that circuit in a manner which will be described more fully hereinafter in connection with FIG. 3.

As mentioned above, the control system illustrated by the block diagram of FIG. 1 is intended for use in controlling the loading of the generator 11. For this reason, in the following discussion of the overall operation of the control system, it will be assumed that the generator 11 has been started, and has been brought up to speed so that now the problem is initially to load the generator so that it will assume its proportionate share of the electric power (load) to be supplied to some distant facility. Under these assumed conditions, the load feedback path 18 will develop a feedback signal, indicative of the load being supplied by the generator 11, for use by the electrohydraulic control equipment 22 in a known manner. A portion of the load feedback signal also is supplied back over the path 18a for use by the loading control circuit 29 in a manner to be described more fully hereinafter. Further, various instruments located at critical points on the turbine equipment for measuring such values as temperature, vibration, expansion, eccentricity, elongation, etc., also supply signals indicative of these measured quantities to the feedback signal transducer and amplification circuitry shown at 25. This circuitry then supplies certain of the signals directly to the alarm section 26 for use by that section to indicate to the operator that any one of these values has attained an alarm level. In addition, certain of the signals, primarily temperature at specific locations, are supplied to the computation section 27 which employs these input parameters in developing output analogue signals representing the actual present and predicted future stress margins for the bore and shell of the high pressure and reheat turbine stages.

It has been determined that the predicted stress margin values as well as the actual value of the temperature within the bore and shell of the high pressure and reheat turbine stages are the most critical stress margins and temperature values occurring in the turbine-generator set. For this reason, the signals representative of these values are developed by the computation section, and supplied through the main gate selection circuit 28 for use by the loading control section 29. As stated previously the main gate 28 selects the lowest margin signal from the computation section for use in controlling the loading control 29. Thereafter, the loading control 29 develops a pulse width modulated output signal that is used in driving the automatic slow synchronous speed motor 31 to cause it to adjust the reference potentiometer 33 through the reduction gear assembly 32. Adjustment of the reference potentiometer 33 then controls the operation of the electrohydraulic control equipment 22 to cause it to move the valve actuator mechanism 21. The valve actuator mechanism 21 then in turn opens or closes the main steam control valve and its associated bypass valve and control valves indicated at 15 to appropriately adjust the steam supply to the high pressure turbine 12 in accordance with the dictates of the lowest value control signal supplied to the loading control circuit 29 by the main gate selection circuit means 28.

From a consideration of the above description, it will be appreciated that the control system of the invention in effect allows for a continuous monitoring of the predicted stress margins at several points on the bore and shell of the high pressure and reheat turbine stages, and thereafter uses the predicted stress margins and actual temperature values at these critical points in controlling loading of the generator 11. As a consequence, the loading of the generator to a preset desired loading level can be achieved in an optimum period of time with minimum hazard to the turbine-generator set. This is accomplished as a result of the fact that continuous monitoring of the critical temperatures and speeds is accomplished along with continuous almost instantaneous computation of the actual and predicted stress margins occurring in the turbine casing and bore. Further, it will be appreciated that because the lowest value actual or predicted stress margin signal or temperature signal operates through the loading control circuit 29 and slow synchronous motor 31 to set or adjust the valve actuator mechanism 21, and hence the main steam valve and its associated bypass and control valve assembly 15, that each such setting of the main steam and associated bypass and control valve 15 operates in effect to establish a reference against which further computed stress margin and temperature signals can be compared. Thus, the mechanical positioning of the main valve assembly by the actuator 21, electrohydraulic control equipment 22 and constant speed motor 31 operates in effect as a memory for the entire system for the purpose of ascertaining whether or not further control signal inputs from the computation section 27 will effect an increase or decrease in the loading of the generator 11. The manner in which this is accomplished will be described more fully hereinafter in connection with the detailed description of the loading control circuit 29 shown in FIG. 3.

Main Gate Selection Circuit Means

Figure 2:
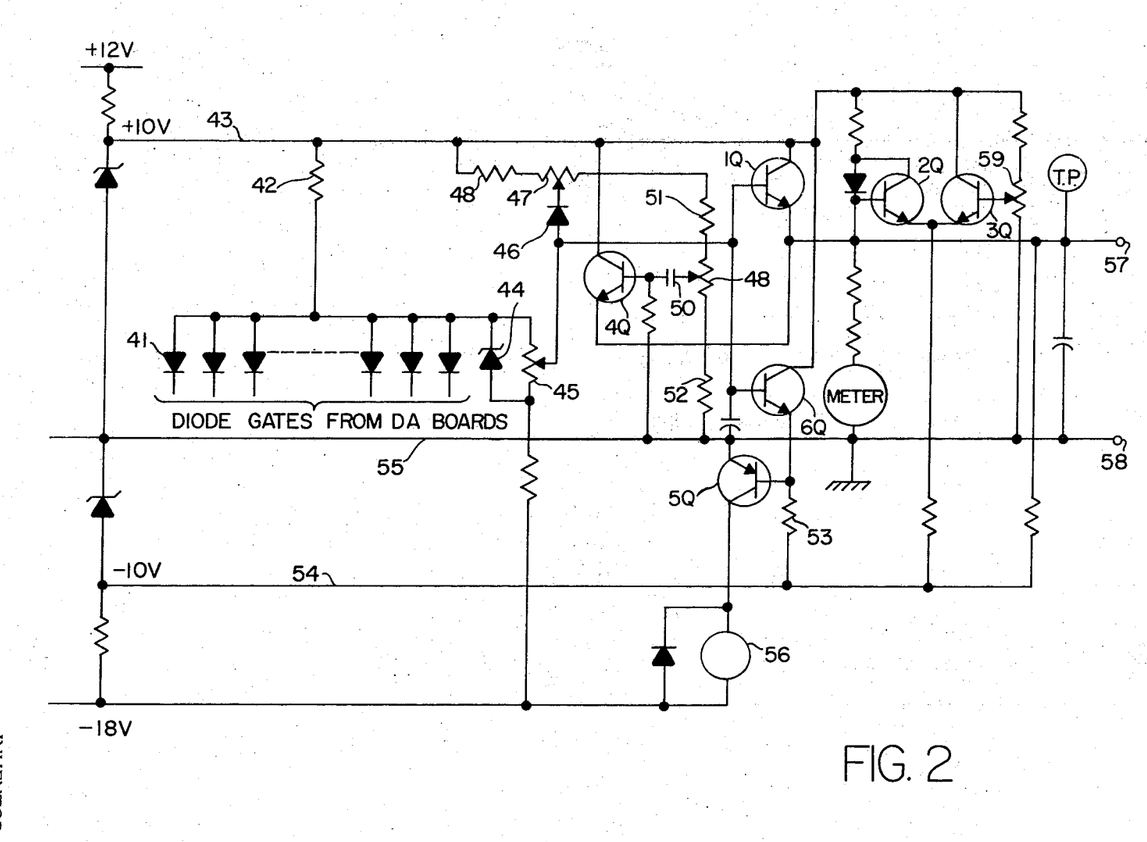
FIG. 2 is a schematic circuit diagram of the main gate circuit portion of the control system shown in FIG. 1.

The construction of the main gate selection circuit 28 is shown in FIG. 2 of the drawings. As stated previously, the main gate selection circuit 28 takes the positive direct current analogue signals supplied from the digital to analogue converter in the computation section 27 and determines the one having the lowest margin value. For this purpose, a plurality of diode gates shown at 41 are provided having their cathodes connected to the respective outputs from the digital analogue circuits in the computation section 27, and having the anodes thereof connected through a common resistor 42 to a +10 volt supply terminal 43. By reason of this connection, the digital to analogue signal supplied to that diode gate 41 which has a minimum value will allow its diode to conduct, while all the remaining diodes will be maintained in a blocking condition in the usual manner of a diode gate. The resulting signal developed across the resistor 42 is supplied to the base of a transistor 1Q through a Zener diode 44 and the movable contact of a potentiometer 45. The Zener diode 44 comprises a part of a bias circuit which further includes potentiometer 45 that serves to add a reserve bias of a maximum of 2.5 volts to the zero margin level signal being applied to the base of transistor 1Q. As a result of the addition of this reserve bias, the zero margin level signal will not be at a 0 volt level but will have some finite value above 0 volt level so as to permit a reserve for overshoot and other similar contingencies.

In addition to the above connections, the base of the transistor 1Q is connected through a silicon diode 46 to the movable contact of a second potentiometer 47. The potentiometer 47 and silicon diode 46 serve to limit the maximum voltage that can be applied to the base of the transistor 1Q so as to in effect clip the maximum voltage at a predetermined 5 volt level. The emitter of transistor 1Q is connected to the emitter of a transistor 4Q which serves to insert a minimum 1.66 voltage level clip into the signal being processed at this point. The collector of transistor 4Q is connected directly to the 10 volt power supply terminal 43, and the base of transistor 4Q is connected through the contact 50 of a critical speed actuated relay to the movable contact of a third potentiometer 48 for setting the minimum 1.66 voltage clip level at which the transistor 4Q operates. The potentiometers 48 and 47 together with the resistors 49, 51 and 52 comprises a voltage divider for developing both the 5 volt maximum clip and the 1.66 volt minimum clip for the control signal being processed.

The selected signal supplied to the base of transistor 1Q by the diode gates 41 is also supplied to the base of a transitor 6Q whose emitter collector is connected in series with a resistor 53 across the power supply terminal 43 and a negative 10 volt power supply terminal 54. The emitter of transistor 6Q is also connected to the base of a transistor 5Q whose emitter is connected to the ground terminal 55, and whose collector is connected in series with the actuating winding of an overstress relay 56. As a consequence of this arrangement, in the event that the signals supplied from the diode gate 41 fall below a minimum predetermined value, the transistor 5Q will be rendered conductive and will actuate the overstress relay 56 to indicate overstress in the turbine casing or core or the existence of a predicted negative temperature margin.

In the eventuality that the turbine-generator set has not been brought up to a speed within the critical speed range mentioned previously, the contacts 50 of the critical speed range relay will not have been closed. The particular control system here described is designed so as to assume an operating condition of a minimum of 10 r.p.m. at all times except under circumstances when a hold is called for. Under situations where a hold is called for, the design of the electrohydraulic control 22 is such that it takes care of these situations automatically external of the control system of the invention. Similarly, the design is such that it will automatically handle the turbine during startup prior to reaching the 10 r.p.m. assumed minimum acceleration. Thereafter, the control system shown in FIG. 1 will take over and control operation of the turbine-generator set to assure proper loading at an optimum rate with minimum hazard to the equipment. Because of these circumstances, the output from the main gate which is taken off of the terminals 57 and 58, is always limited to a minimum value of 0.14 volt rather than 0. The 0.14 volt corresponds to an acceleration of 10 r.p.m./min. of the turbine-generator set being controlled.

In order to assure that the minimum output voltage of 0.14 volt is always present at the output terminals 57 and 58 under circumstances where the contacts 50 have not been closed within the critical speed range, the balanced amplifier comprised by the transistors 2Q and 3Q is provided. The balanced amplifier comprised by transistors 2Q and 3Q is also required for temperature compensation purposes, and is adjusted by means of a set minimum speed potentiometer 59 whose movable contact is connected to the base of the transistor 3Q. The minimum voltage appearing at the output terminal 57 is adjusted by adjusting the base potential of the transistor 3Q. The minimum voltage level limiting action takes place through differential action between the transistors 2Q and 3Q and the diode interconnected between the collector and base of the transistor 2Q which maintains the outgoing voltage level of terminal 57 equal to or above the 0.14 volt minimum level required.

The overall operation of the main gate selection circuit shown in FIG. 2 is as follows. If the turbine-generator set is accelerating within the critical speed range, the contacts 50 will be closed and the output voltage appearing at the output terminal 57 will be at a value of 1.66 volts which corresponds to an acceleration of 120 r.p.m./min. as required in the critical speed range. If the turbine-generator set is not operating within this speed range, then the minimum voltage level appearing at the output terminal 57 will be at the 0.14 volt level determined by the potentiometer 59 and balanced amplifiers 2Q and 3Q. It has been previously assumed as a condition of operation; however, that the turbine is up to speed and that the loading is to be controlled by the control system herein described. Accordingly, it will therefore be assumed that the contacts 50 are open and that controlling signals are being supplied from the digital to analogue converter circuits of the computation section 27 to the diode gates 41.

Under these above-assumed conditions, the diode gate 41 will select the minimum value signal for application to the base of the transistor 1Q. This minimum signal is added to a reserve bias signal supplied from the potentiometer 45 and the resultant total signal is clipped or limited to a maximum value of 5 volts by the silicon diode 46 and the setting of the potentiometer 47. The resultant clipped and augmented signal applied to the base of transistor 1Q thereby controls its conductivity to control the output voltage appearing at the output terminal 57 for use in controlling the operation of the loading control circuit section 29 shown in FIG. 1. In the event that this resultant signal tends to go negative thereby indicating an overstress condition in the turbine, the transistor 5Q will be turned on to actuate the overstress relay 56. The output control voltage appearing at the output terminal 57 is then supplied to the loading control circuit section 29 shown in FIG. 1 for use in controlling further operation of the control system.

Loading Control

Figure 3:
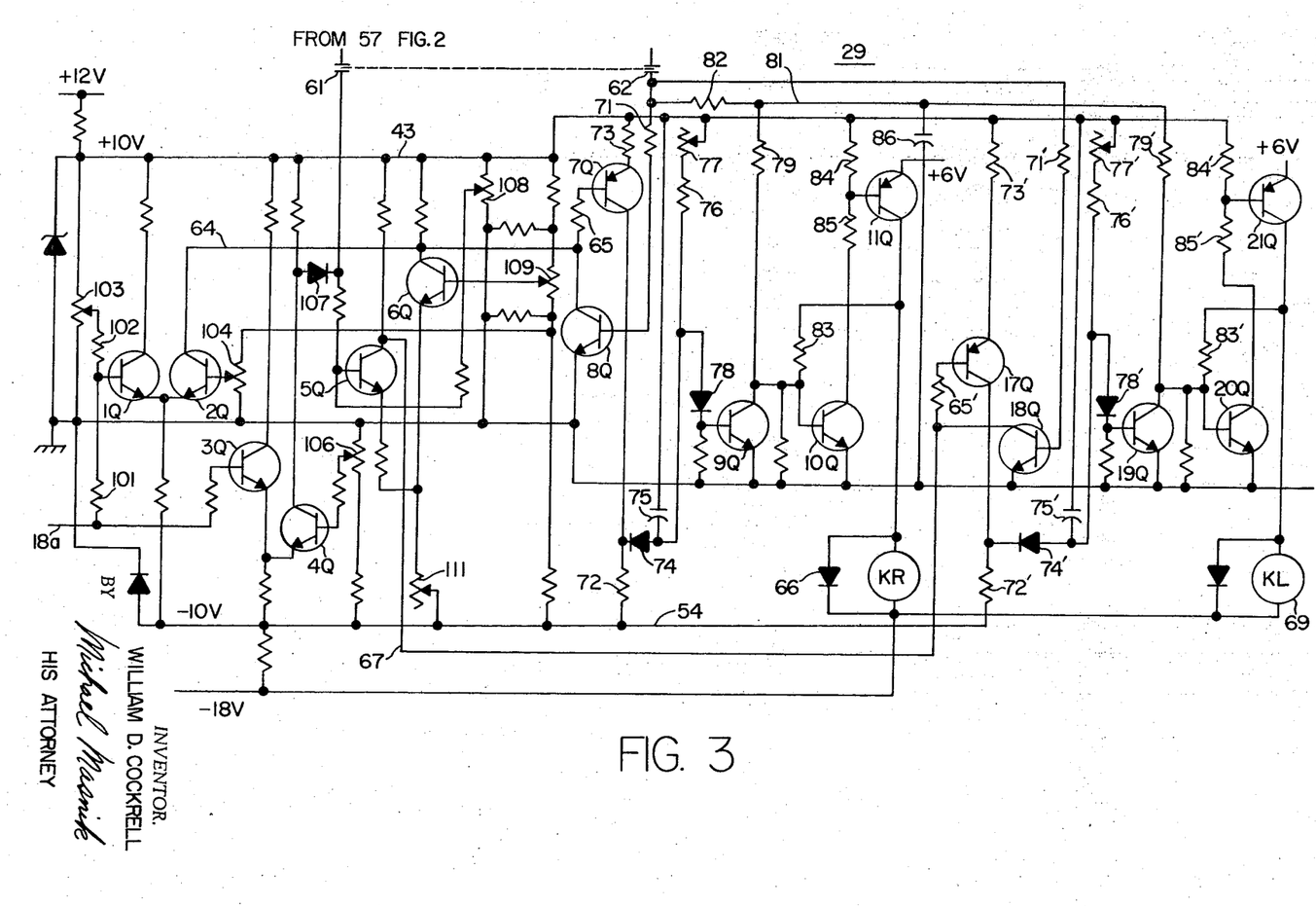
FIG. 3 is a detailed circuit diagram of the pulse width modulation circuit and its associated automatic, slow synchronous speed servomotor drive for use in the present invention.

The loading control circuit section 29 of the system shown in FIG. 1 is illustrated in detail in FIG. 3. The selected control signal appearing at the output terminal 57 of the FIG. 2 circuit, and to be applied in the further control of the operation of the turbine-generator set, is supplied to the loading control circuit of FIG. 3 through the contacts 61 of a relay which is closed at the time of initial energization of the system when the main line circuit breaker is closed. A second pair of contacts 62 is closed concurrently with the closing of the contact 61 for supplying to the loading control circuit 29 square wave-shaped clock pulses which are alternate 10 seconds on—20 seconds off square wave pulses varying between a potential level of 6 volts positive to 0 volts. These clock pulses are obtained from a suitable clock pulse signal source (not shown) included as part of the overall system and located in the computation section 27 of the system arrangement shown in FIG. 1.

The incoming selected control signal supplied from the main gate selection circuit 28 through contact 61 is supplied across a resistor 63 to the base of a transistor 5Q. Transistor 5Q and transistor 6Q form a balanced amplifier arrangement which permits positive and negative control voltages to be developed, and also permits the inclusion of a bias adjustment for setting the zero loading level. For this purpose, the collector of the transistor 6Q is connected through a conductive path 64 and a resistor 65 to the base of a transistor 7Q that in turn controls actuation of a raise relay shown at 66 in a manner to be described more fully hereinafter. Similarly, the collector of the transistor 5Q is connected through a conductive path 67 and a resistor 65' to the base of a transistor 17Q that controls the operation of a lower relay 69. Except for certain minor signal shaping operations, the constant speed motor operation for both the raise and lower function is the same so that the construction and operation of the circuitry for only the raise function will be described in detail.

As stated earlier, the loading control circuit 29 has supplied thereto clock signal pulses which alternately vary from a positive 6 volt value to a 0 volt value at a constant rate. These clock signal pulses are supplied through the main line breaker closed contacts 62 and resistor 71 to the base of a transistor 8Q which has its collector connected through the resistor 65 to the base of transistor 7Q. Transistor 7Q has its emitter-collector connected in series with a resistor 72 and a resistor 73 across the positive and negative 10 volt power supply terminals 43 and 54. The juncture of the resistor 72 with the collector of transistor 7Q is connected through a blocking diode 74 to one terminal of a timing capacitor 75 having the other terminal thereof connected to the 10 volt positive power supply terminal 43. The first mentioned terminal of timing capacitor 75 also is connected through a fixed resistor 76, and a variable resistor 77 back to the positive 10 volt power supply terminal 43. By this arrangement, variation of the variable resistor 77 can control the RC time constant of the circuit comprised by the timing capacitor 75 and the two resistors 76 and 77.

The first mentioned terminal of timing capacitor 75 that is connected through blocking diode 74 to the collector of transistor 7Q is also connected through a second blocking diode 78 to the base of a transistor 9Q. Transistor 9Q has its emitter-collector connected through a resistor 79 to a power supply terminal 81 that is supplied through a voltage dropping resistor 82 with the clock pulses applied across contact 62 from the clock signal source. The collector of transistor 9Q is also connected directly to the base of a transistor 10Q and through a resistor 83 to the collector of a PNP power transistor 11Q. This resistor 83 provides a regenerative action which permits the relay to be either fully on or completely off only. The transistor 10Q has its emitter-collector connected in series with a pair of voltage dividing resistors 84 and 85 across the positive 10 volt power supply terminal 43 and the ground terminal 55. The juncture of the voltage dividing resistors 84 and 85 is connected to the base of the PNP transistor 11Q. The emitter of the transistor 11Q is connected to the +6 volt bus. Transistor 11Q has its emitter-collector circuit connected in series with the actuating windings of the raise relay 66 to a negative 18 volt power source.

In operation, the loading control circuit of FIG. 3 functions in the following manner. During intervals that the signal from the clock source supplied through contact 62 is at its positive 6 volt level, the transistor 8Q is fully conducting. As a result, the base of transistor 7Q is drawn negative with respect to its emitter, so that transistor 7Q becomes conducting and the resistor 72 is drawn above ground potential. This results in discharging the timing capacitor 75 above ground potential so that transistor 9Q is allowed to conduct, transistor 10Q is rendered nonconducting, and the power transistor 11Q operating relay 66 likewise is nonconducting. As a consequence, the relay 66 will be dropped out and remains in its nonactuated condition.

During intervals when the clock signal supplied through the contact 62 reverts to its zero level value, the transistor 8Q is rendered nonconducting, and transistor 7Q is controlled by the potential supplied to the base thereof over conductor 64 from the collector of transistor 6Q. The conductivity of transistor 6Q in turn is controlled by the conduction of transistor 5Q that in turn is controlled by the value of the control signal supplied through the contacts 61 from the main gate selection circuit. As a consequence, during this interval the timing capacitor 75 will be charged to some potential below ground level and held at this point to an extent depending upon the conductivity of transistor 6Q which of course is determined by the value of the control signal being supplied over the contacts 61 from the main gate selection circuit. Concurrently during these same half cycle intervals of the clock signal, the collector of transistor 9Q and the base of transistor 10Q (which depend upon the clock signal potential as a result of their connection to the supply terminal 81) are held at zero potential so that these transistors cannot conduct. However, when the clock signal changes phase so that the potential of terminal 81 is raised to the 6 volt level, transistor 9Q can conduct as soon as the timing capacitor 75 is discharged sufficiently to allow its base to be brought above ground level. The condenser 86 softens the application of voltage to 9Q and 19Q to prevent undesired transients.

The transistor 10, however, can be rendered conductive concurrently with the change in phase of the clock signal, and in turn causes the power transistor 11Q to be rendered conductive and activate the raise relay 66. Concurrently with this action, the rise of the clock potential has started transistor 8Q conducting so that transistor 7Q is then rendered fully conducting, and the timing capacitor 75 starts to discharge in a positive direction until transistor 9Q turns on. Upon turn-on of 9Q, the transistors 10Q and 11Q are turned off thereby determining the interval of time that the raise relay 66 is activated. The rate at which the timing capacitor 75 discharges is determined by the setting of the variable resistor 77, and the length of time that is required to turn on transistor 9Q is of course determined by the level to which it was charged during the preceding 0 voltage level half cycle of the clock signal. This length of time determines the point of turn-off transistors 10Q and 11Q and hence determines the pulse width modulation of the signal pulse applied to the actuating winding of the raise relay 66. If during a preceding 6 volt level half cycle of the clock signal, timing capacitor 75 has not been charged below ground level by conduction of transistors 6Q and 7Q, then 9Q turns on concurrently with the change in phase of the clock signal, and transistors 10Q and 11Q are maintained off. Under these circumstances raise relay 66 will not be activated.

Operation of the circuit with respect to the actuation of the lower relay 69 is similar to that described above with respect to the raise relay 66. For this reason, corresponding elements of the lower relay circuit have been identified with the same reference character primed and the transistors employed have been raised in identifying reference numeral by a factor of 10. For example, the transistor corresponding to transistor 7Q is identified as 17Q, that corresponding to 8Q is 18Q, and so on. In all other respects, the operation of the lower relay circuit is the same as that of the raise relay.

Figure 3A:
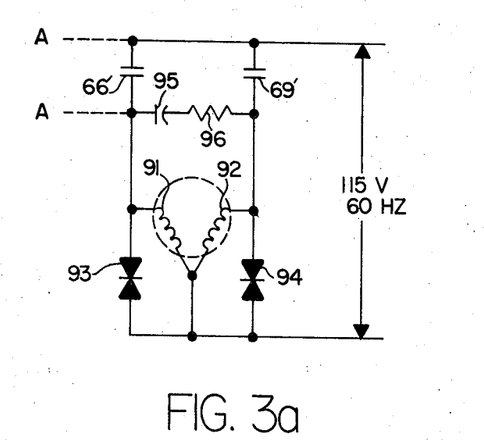

FIG. 3a of the drawings illustrates the wiring diagram for the slow synchronous speed servomotor which is energized by the raise and lower relays 66 and 69, respectively. The contacts of the raise relay 66 are shown at 66' and the contacts of the lower relay 69 are shown at 69'. It will be appreciated that in FIG. 3a only the actuating windings 91 and 92 of the servomotor are illustrated. The rotor of the motor would of course be mechanically coupled to the reducing gear assembly shown schematically in FIG. 1 that drives the electrohydraulic valve control mechanism of the system. The actuating winding 91 will be connected across a power supply source for actuating the servomotor which in the embodiment of the invention disclosed comprises a 115 volt, 60 cycle alternating current source. Excitation of the raise winding 91 will occur when the contacts 66' are closed during excitation of the raise relay 66 by the loading control circuit of FIG. 3. Similarly, excitation of the lower winding 92 will occur during closure of the contacts 69' by the loading control circuit. Protective thyristors shown at 93 and 94 are connected across each of the windings 91 and 92, and phase-splitting capacitor 95 and a current limiting resistor 96 are connected across both windings in a conventional manner.

Figure 3B:
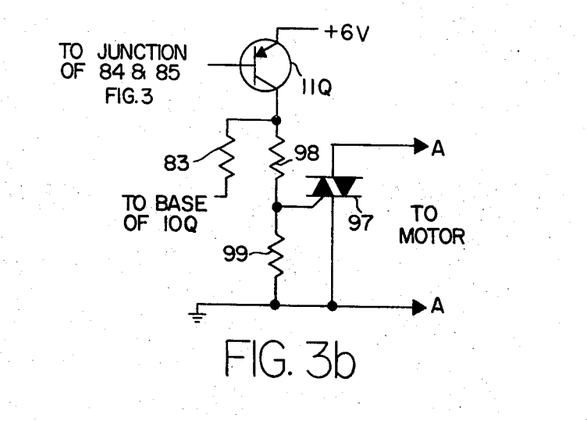

If desired, it is entirely possible to replace the excitation circuit of FIG. 3a with the power semiconductor circuit configuration shown in FIG. 3b. With the excitation circuit of FIG. 3b, a power rated semiconductor triode known commercially as the triac indicated at 97 can be inserted in place of one of the contacts such as 66' in the series with the raise actuating winding 91. A similar power triac (not shown) would be connected in series with the lower winding 92 in place of the relay contact 69'. With such an arrangement, turn-on and turn-off of the triac 97 would be controlled directly by the transistor, such as 11Q, in the pulse width modulation control circuit. Under such circumstances, transistor 11 would have its emitter-collector connected across a pair of voltage dividing resistors 98 and 99 which in turn are connected to the control gate of the triac 97. Upon turn-on of the transistor 11Q, a turn-on gating pulse will be applied to the triac 97 which then in turn would be turned on to excite the actuating winding 91. A similar connection would be required for the triac exciting the lower actuating winding 92 in order to drive the servomotor in the reverse or lower direction.

Referring back to FIG. 1 of the drawings, it should be remembered that in addition to the externally derived feedback signals which are indicative of the actual instantaneous stress margins and predicted stress margins as well as temperatures in the turbine case and bore, supplied through the main gate 28 to the loading control circuit 29, a direct feedback signal of primary interest is supplied thereto over the path 18a. This direct feedback signal is in effect a signal representative of the loading on the generator 11. As shown in FIG. 3 of the drawings, this direct feedback signal supplied over conductor path 18a is applied across a pair of voltage dividing resistors 101 and 102 which are also excited from the movable contact of a terminal load set reference potentiometer 103. The parameters of the circuit are adjusted so that a −10 volt load feedback signal is representative of 100 percent load on the turbine-generator set. Since the terminal load set reference potentiometer 103 applies its output voltage across the voltage dividing resistors 101 and 102 in opposition to the load feedback signal supplied to the circuit across path 18a, the maximum of the terminal load set potentiometer 103 is adjusted to equal the maximum load feedback signal of −10 volts. The juncture of the voltage dividing resistors 101 and 102 is connected to the base of a transistor 1Q which is connected in a balanced amplifier circuit arrangement with a second transistor 2Q whose collector is connected directly to the collector of transistor 6Q. By this arrangement, if at any point during the loading of the turbine-generator set, the load feedback signal supplied over the path 18a approaches the value of the terminal load fed into the terminal load set potentiometer 103, the transistor 1Q will gradually turn off. Upon transistor 1Q being burned off, transistor 2Q turns on and loads down the collector of transistor 6Q so as to prevent it from permitting a raise signal to be supplied to the raise relay 66 in the previously described manner. A potentiometer 104 has its movable contact connected to the base of the transistor 2Q to provide a set balance adjustment for the transistor 2Q in initially aligning the circuit for operation.

In a similar manner, a pair of balanced transistors 3Q and 4Q will operate to maintain a minimum loading setting as adjusted by a minimum load reference potentiometer shown at 106 in the event that the load feedback signal across conductor 18a drops to a value less than the required 0.3 volt representing 3 percent loading on the turbine-generator set. It will be seen that in the event that the feedback signal drops below this minimum set value, the transistor 3Q is switched off, and the transistor 4Q rendered conductive. Upon transistor 4Q being rendered conductive, a turn-on potential is applied through the blocking diode 107 to the base of transistor 5Q to cause this transistor to actuate the raise relay 66 in the previously described manner.

In addition to the above adjustments, there is a further requirement that means be provided for adjusting the zero level condition. By the zero level loading condition is meant that position of the main steam valve and its associated bypass and control valves, which is considered to be in neutral, will neither open or close further due to the value of the signals (known as the zero loading level value) supplied to the loading control circuitry. For this purpose, a zero loading adjusting potentiometer 108 is provided for adjusting the bias applied to the base of the transistor 5Q and an input balance potentiometer 109 is provided for adjusting the bias applied to the base of the transistor 6Q. The width of this zero loading level value can be adjusted by a potentiometer 111 connected to the collector of transistor 6Q. With these potentiometers, the zero level adjustment can be made and is normally adjusted to be within the range of 0 to 2½ volts positive. If the zero level is set at the 2½ volt value, there will be an equal range for a raising and lowering of the control system. Obviously, however, if this value is set at the 0 volt level it would leave no range for lowering of the loading condition by closing of the main steam valve. It is assumed, however, that in the normal operation of the circuit, the zero level adjustment will be set at the 2½ volt value so as to provide for both further opening and further closing of the steam valve by the control system.

In the operation of the loading control circuit shown in FIG. 3, the terminal and minimum load set are first adjusted by appropriate setting of the potentiometers 103 and 106. Zero loading level is then adjusted by appropriate setting of the potentiometers 108, 109 and 111 to provide for both raising and lowering of the servodrive motor. The direct current analogue signal from the main gate calling for either raising or lowering of the steam valve is supplied through the closed contacts 61 to the balanced amplifier comprised by transistors 5Q and 6Q. Balanced amplifier 5Q, 6Q then functions to develop pulse width modulated controlling signals that are applied to the actuating windings of the servomotor controlling the opening or closing of the steam valve of the turbine-generator set to thereby properly adjust the loading condition. In the event that the loading drops below a minimum 3 percent value, transistor 4Q is rendered conductive and the control circuit automatically increases the loading on the set. Upon reaching the terminal load set into the potentiometer 103, transistor 2Q conducts and loads down the collector of transistor 6Q to prevent further raising or opening of the main steam valve. In the intervening periods of operation several of the DC analogue signals being supplied to contact 61 from the main selection circuit adjust the opening of the main steam valve up or down in a manner depending upon the value of the analogue signal applied thereto from the computation section 27 through the main gate selected selection circuit. During this adjustment period that last set position of the valve assembly serves as a mechanical memory for the system.

From the foregoing description it will be appreciated that the invention makes available a new and improved control system for electrically controlled, mechanically actuated mechanisms of large power rating such as turbine-generator sets. While the specific embodiment of the invention disclosed is intended for use with a turbine-generator set, it is believed obvious that the system can be applied equally well to other similar mechanically actuated mechanisms such as automatically controlled machine tools, milling machines, lathes, drill presses and the like, wherein the mechanically actuated mechanism upon being positioned can serve as a memory for further operation of the control system. The control system can be used with any apparatus wherein it is desired to automatically control startup, initial loading and/or running of the mechanism in a manner such that a number of control factors can selectively exercise control over the operating condition of the mechanism thereby assuring safe startup and loading within an optimum time period with minimum hazard to the equipment. This is achieved while allowing a control factor of primary interest such as loading, speed, position, etc., to override and assume control of the mechanism upon obtaining a predetermined operating condition.

Having described one specific embodiment of a control system constructed according to the invention, it is believed obvious that other modifications and variations of the invention will be suggested to those skilled in the art in the light of the above teachings. It is therefore to be understood that changes may be made in the particular embodiment of the invention described, and that any such changes that come within the spirit and scope of the invention as defined by the appended claims, are intended to be covered.

I claim:

1. A control system for electrically controlled, mechanically actuated power mechanisms having mechanical actuating means for controlling the operating condition of the mechanism, means for measuring a plurality of stress margins developed during operation of said mechanisms, means for selecting the predominant one of said measured margins to provide a source of electric control signals, the control system comprising electric power modulation circuit means having its input coupled to said source of electric control signals for controlling the operation of the mechanism and for producing pulses of alternating electric power having a pulse width which is varied in accordance with an operating characteristic of said electric control signals, and an AC motor having its output mechanically coupled to and controlling the position of said mechanical actuating means and having its input coupled to and controlled by the output from the electric power modulation circuit means, said mechanical actuating means being mechanically positioned by the electromechanical positioning means and upon being so positioned thereafter serves as a memory unit for the control system until the next adjustment of the operating condition by the source of electric control signals.

2. A control system according to claim 1 wherein said electric power modulation circuit means comprises a pulse width modulation circuit having a source of constant frequency AC power supplied thereto and two output terminals, the input control signal serving to selectively control the width of the pulses of electric power produced by the modulation circuit and select the output terminal to which such pulses of electric power are supplied, the pulses of electric power from one of the output terminals serving to drive the AC motor in one direction and the pulses of electric power from the remaining terminal serving to drive said motor in the other direction, and an AC power output stage selectively excited by the pulses of electric power for driving the AC motor.

3. A control system according to claim 2 wherein the AC motor comprises a servomotor having at least two actuating windings for selectively driving the motor in opposite directions and being mechanically coupled to and driving the mechanical actuating means, the said servomotor having one of its actuating windings selectively energized by the series of pulses of electric power derived from one output terminal for driving the AC motor in a first direction to an extent determined by the electric control signals, and having the remaining actuating winding selectively energized by the series of pulses of electric power derived from the remaining output terminal for driving the AC motor in the reverse direction to an extent determined by the electric control signals.

4. A control system according to claim 3 wherein the power output stage comprises a pair of relays having the exciting windings thereof connected to respective ones of the output terminals for excitation by the pulses of electric power and having the contacts thereof connected to appropriate actuating windings of the servomotor motor along with a source of excitation power to control operation of the servomotor.

5. A control system according to claim 3 wherein the power output stage comprises a pair of power semiconductor devices having the control elements thereof connected to respective ones of the output terminals for excitation by the pulses of electric power and having the load terminals thereof connected to appropriate actuating windings of the servomotor along with a source of excitation power to control operation of the servomotor.

6. A control system for electrically controlled, mechanically actuated mechanisms of large power rating having mechanical actuating means for controlling the operating condition of a mechanism, said control system comprising means for developing a plurality of externally derived electric feedback signals representative of a plurality of externally measured quantities indicative of a number of stress margin characteristics of the mechanism being controlled, main gate selection means having the plurality of externally derived feedback signals supplied thereto as inputs for selecting a desired one of the externally derived feedback signals for use in controlling operation of the mechanism, electric power modulation circuit means having its input coupled to the output from the main gate selection means for producing pulses of AC electric power, and an AC motor, means for adjusting the speed of said AC motor comprising means for applying pulses of AC electric power from said said electric power modulation circuit means to the input of said AC motor and means for varying the width of said pulses of AC electric power in accordance with the output from the main gate selection means, said mechanical actuating means being mechanically positioned by the AC motor and upon being so positioned thereafter serves as a memory unit for the control system until the next adjustment of the operating condition of the mechanism by the control signal supplied by the main gate selection means.

7. A control system according to claim 6 wherein said electric power modulation circuit means comprises a pulse width modulation circuit having a source of constant period, pulsed AC electric power supplied thereto and two output terminals, the input control signal serving to selectively control the width of the pulses of AC electric power produced by the modulation circuit and select the output terminal to which the pulses of AC electric power are supplied, pulses of AC electric power from one of the output terminals serving to adjust the electromechanical positioning means in one direction and the pulses of AC electric power from the remaining terminal serving to adjust the positioning means in the other direction, and a power output stage selectively excited by the pulses of AC electric power for driving the electromechanical positioning means.

8. A control system according to claim 7 further including circuit means for adjusting the zero bias level of the pulse width modulation circuit so that it responds in a different manner to incoming control signals from the main gate selection means which are over or under this zero bias level to thereby derive the pulses of AC electric power for each of the output terminals thereof, the pulses of AC electric power being applied to one output terminal in response to the incoming control signal exceeding the zero bias level and being applied to the other output terminal in response to the incoming control signal dropping below the zero bias level.

9. A control system for electrically controlled, mechanically actuated mechanisms of large power rating having mechanical actuating means for controlling the operating condition of a mechanism, said control system comprising means for developing a plurality of externally derived electric feedback signals representative of a number of stress margin characteristics of the mechanism being controlled, main gate selection means having the plurality of externally derived feedback signals supplied thereto as inputs for selecting a desired one of the externally derived feedback signals for use in controlling operation of the mechanism, electric power modulation circuit means having its input coupled to the output from the main gate selection means for modulated control electric power signals, electromechanical positioning means having its output mechanically coupled to and controlling the position of said mechanical actuating means and having its input coupled to and controlled by the output from the electric power modulation circuit means, said mechanical actuating means being mechanically positioned by the electromechanical positioning means and upon being so positioned thereafter serves as a memory unit for the control system until the next adjustment of the operating condition of the mechanism by the control signal supplied by the main gate selection means, direct feedback means for deriving a primary feedback signal that is directly related to an operating condition of the controlled mechanism that is of primary interest in the control of the mechanism, said direct feedback means being coupled to said electric power modulation circuit means as an additional input thereto, and override control circuit means comprising a part of said electric power modulation circuit means and controlled by said primary feedback signal for overriding and taking over control of the operation of said electric power modulation circuit means in response to the primary feedback signal attaining a predetermined value.

10. A control system according to claim 9 wherein the override control circuit means comprises a terminal load set potentiometer connected in opposition to the direct feedback connection to the pulse width modulation circuit whereby upon the primary feedback signal exceeding the terminal load value set into the potentiometer, further production of pulse width modulated output signals in the increasing load direction is prevented.

11. A control system according to claim 10 wherein the override control circuit means further includes a minimum load potentiometer and comparison circuit means for comparing the primary feedback signal to the minimum load value set on the minimum load potentiometer and for overriding control of the pulse width modulation circuit upon the primary feedback signal dropping below the preset minimum load value to thereby cause the pulse width modulation circuit to produce output pulse width modulated signals at the output terminal thereof which will cause the load to increase.

12. A control system according to claim 11 wherein the mechanism being controlled comprises a steam turbine-generator set, the mechanical actuating means comprises the main steam supply valve from the boiler to the turbine and its associated bypass and control valves and electrohydraulic actuating mechanism, the means for developing a plurality of externally derived electric feedback signals comprises a plurality of sensing instruments for sensing turbine casing temperature, pressure, turbine speed, expansion, vibration, eccentricity, elongation, etc., together with computation circuits which derive predicted future values of such operating conditions from the existing instantaneous measured values, and the electromechanical positioning means comprises a constant speed servomotor mechanically driving a reference potentiometer that in turn controls the electrohydraulic valve actuating mechanism of the steam turbine, the said servomotor having one of its actuating windings selectively energized by the series of pulse width modulated control signals derived from one of the output terminals of the pulse width modulation circuit to cause the servomotor to drive the reference potentiometer in a direction to increase loading on the turbine-generator and having the other of its actuating windings selectively energized by the series of pulse width modulated control signals derived from the other output terminal of the pulse width modulation circuit to cause the servomotor to drive the reference potentiometer in a direction to decrease loading on the turbine-generator set.

13. A control system according to claim 12 further characterized in that the direct feedback means comprises a load feedback signal from the generator to the pulse width modulation circuit and constitutes primary feedback signal that is directly related to the loading on the turbine-generator set.

14. A control system according to claim 13 wherein the mechanical connection of the servomotor to the reference potentiometer is through a suitable gear assembly that is also geared to and selectively driven by a manual reference adjustment knob for manually overriding and additionally controlling the operation of the turbine-generator set.

15. A control system according to claim 14 wherein the power output stage of the pulse width modulation circuit comprises a pair of relays having the exciting windings thereof connected to respective ones of the output terminals of the pulse width modulation circuit for excitation by the pulse width modulated clock pulses and having the contacts thereof connected through a source of energizing power to appropriate actuating windings of the servomotor to control the direction and extent of movement of the servomotor.

16. A control system according to claim 14 wherein the power output stage of the pulse width modulation circuit comprises a pair of power semiconductor devices having the control elements thereof connected to respective ones of the output terminals of the pulse width modulation circuit for excitation by the pulse width modulated clock pulses and having the load terminals thereof connected to appropriate actuating windings of the servomotor to control the direction and extent of movement of the servomotor.

17. In an operating system which produces differently measurable quantities representing the operating conditions of said system, means for controlling said operating system comprising means for providing first signals representative of stress margins developed by said operating system, means for selecting and processing desired ones of said first signals to produce a plurality of different control signals, said means for selecting and processing desired ones of said control signals comprising a source of reference signals and means for comparing given ones of said first signals with corresponding ones of said reference signals to produce said control signals, a source of clock signals having a given recurrence rate, means for producing output signals, means responsive to said given recurrence rate clock signals to control the recurrence rate of said output signals, means responsive to selected ones of said control signals to control the number of time recurrences of said output signals at said recurrence rate, a motor, and means for controlling motor action comprising means for applying said output signals to said motor.

18. An arrangement according to claim 17 further comprising a source of additional control signals, and means responsive to said additional control signals and said motor action to produce a resultant output control signal, and means for controlling said operating system with said resultant output control signal.

19. An arrangement according to claim 17 further comprising a signal divider for producing resultant signal s signals having a signal characteristic adjustable between a maximum and a minimum value, and means for controlling the value of said signal characteristic in response to said motor action.

20. A turbine loading control closed cycle system comprising a constant speed servomotor, a source of clock pulses, a source of first control signals representing stress margins developed by said turbine during operation, means responsive to said clock pulses for providing pulsed AC power of given frequency for controlling motor operation, means for controlling the duration of said power pulses of given frequency as a function of said first signals, and means responsive to said motor operation to provide control without overcontrol or hunting.

21. A turbine loading control comprising a source of analogue signals representing a plurality of stress margins developed during operation of said turbine, means for selecting the most critical of said signals and converting said selected signals to pulses of AC power of given frequency whose pulse width varies as a function of the magnitude of said most critical of said signals, a constant speed AC servomotor, a controllable system, means for adjusting the average speed of said AC motor comprising said motor responsive to said pulses of electric power to provide proportional control of said system.

22. An arrangement according to claim 21 further comprising means for constraining motor speed between given values, system output between given values and the balance level between directions of rotation of said servomotor.